(12) United States Patent
Rodrigues et al.

(10) Patent No.: US 9,120,048 B2
(45) Date of Patent: Sep. 1, 2015

(54) ADSORBER WITH HORIZONTAL AXIAL BED AND CLEARING SYSTEM OF PACKING

(71) Applicant: L'Air Liquide, Société Anonyme pour l'Etude et l'Exploitation des Procédés Georges Claude, Paris (FR)

(72) Inventors: Guillaume Rodrigues, Montigny-le-Bretonneux (FR); Clément Lix, Versailles (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 0 days.

(21) Appl. No.: 14/322,310

(22) Filed: Jul. 2, 2014

(65) Prior Publication Data

US 2015/0007722 A1    Jan. 8, 2015

(30) Foreign Application Priority Data

Jul. 2, 2013    (FR) ...................................... 13 56414

(51) Int. Cl.
*B01D 53/02*    (2006.01)
*B01D 53/04*    (2006.01)
*C01B 13/02*    (2006.01)
*B01D 53/047*    (2006.01)

(52) U.S. Cl.
CPC ............ *B01D 53/04* (2013.01); *B01D 53/0423* (2013.01); *B01D 53/0446* (2013.01); *C01B 13/0259* (2013.01); *B01D 53/047* (2013.01); *B01D 2259/40* (2013.01); *B01D 2259/4146* (2013.01)

(58) Field of Classification Search
CPC .................. B01D 2259/40; B01D 2259/4146; B01D 53/04; B01D 53/0423; B01D 53/0446; B01D 53/047; C01B 13/0259
See application file for complete search history.

(56) References Cited

U.S. PATENT DOCUMENTS

| 5,882,385 | A   |   | 3/1999 | Bosquain et al. |        |
|-----------|-----|---|--------|------------------|--------|
| 6,334,889 | B1  | * | 1/2002 | Smolarek et al.  | 96/149 |
| 8,216,343 | B2  | * | 7/2012 | Ackley et al.    | 95/96  |

(Continued)

FOREIGN PATENT DOCUMENTS

| EP | 1 080 772 | 3/2001 |
|----|-----------|--------|
| GB | 1 309 427 | 3/1973 |

OTHER PUBLICATIONS

French Search Report and Written Opinion for FR 1356414, Mar. 14, 2014.

*Primary Examiner* — Christopher P Jones
(74) *Attorney, Agent, or Firm* — Elwood L. Haynes

(57) ABSTRACT

Installation for treating a fluid comprising, in a section of a horizontal shell ring (1) a first particulate material filling a volume (V2), a deflector comprising 2 volumes V3 delimited by the internal shell of the shell ring and on the other hand by lower surfaces S3*a* and S3*b* making with a horizontal plane an angle (α) greater than the angle of repose of the first particulate material, a volume (V4) formed of a membrane backing up against the two volumes (V3) of the deflector over the entire length of the section of the shell ring, and of a second particulate material with which the volume (V2) is filled; the second particulate material being contained in the space formed by the membrane and the internal shell of the shell ring, the volumes V3 and V4 being situated in the upper half of the cross section of the horizontal shell ring.

6 Claims, 2 Drawing Sheets

(56) References Cited

U.S. PATENT DOCUMENTS

| | | | |
|---|---|---|---|
| 8,313,561 B2 * | 11/2012 | Celik et al. | 95/96 |
| 2001/0022955 A1 * | 9/2001 | Petit et al. | 422/218 |
| 2012/0222555 A1 * | 9/2012 | Gupta et al. | 95/136 |
| 2012/0282146 A1 * | 11/2012 | Passler | 422/168 |

* cited by examiner

ADSORBER WITH HORIZONTAL AXIAL BED AND CLEARING SYSTEM OF PACKING

CROSS REFERENCE TO RELATED APPLICATIONS

This application claims the benefit of priority under 35 U.S.C. §119 (a) and (b) to French Application No. 1356414, filed Jul. 2, 2013, the entire contents of which are incorporated herein by reference.

BACKGROUND

The present invention relates to installations for treating at least one fluid, comprising at least one mass of particulate material through which the fluid circulates in a horizontal axial direction.

When gases are to be produced, separated or purified, use may be made of adsorption methods. These generally employ several adsorbers filled with materials which are selectively adsorbent towards at least one of the constituents of the feed stream. There are 2 main types of adsorbers, axial bed adsorbers and radial bed adsorbers.

Axial bed adsorbers provide an economical solution to the problems of holding the bed and of dead volumes. By contrast, when high flow rates are used the pressure drops and problems of attrition become limiting for this technology. This is because in order to push back the fluidization limit, which ultimately leads to the granules of adsorbent being destroyed, the main solutions are:

- to increase the diameter of the adsorber (with a maximum diameter that has to be adhered to because of transport considerations), which entails reducing the length of the bed, the disadvantage of this being that it presents problems of distribution upstream and downstream of the adsorbent, of increasing dead volumes and of reducing the thickness of the beds thus making the methods more sensitive to the unevenness of the surface of the bed of adsorbent,
- to add adsorbers in order to split the flow passing through the beds,
- to increase the size of the beads of adsorbent, although this is to the detriment of the adsorption dynamics and therefore the performance of the unit, and
- to add weight to the upper part of the adsorbent, for example using metal beads separated from the adsorbent by a flexible grating.

These last 2 solutions allow the theoretical limit of attrition in an axial configuration only to be pushed back a little.

It will be noted that present day axial adsorber geometries employed include the "upright bottle" and the "lying-down bottle" geometries, both with the gas circulating vertically through the adsorbent bed. While the latter geometry offers a larger bore sectional area than the former, it is nonetheless penalized by poor distributions, notably at the edges of the adsorber, and greater dead volumes.

A radial bed adsorber allows pressure drops to be limited without increasing the radius of the adsorber because it offers a bore sectional area that is increased for a given volume of adsorber and is theoretically not subject to any limit in terms of attrition. The bed of adsorbent is generally suspended between vertical perforated gratings suspended from the top. The appearance of empty volumes at the top of the beds of adsorbent can be prevented either by a cone system that adheres to the angle of heaping (essentially used in TSA) as described in U.S. Pat. No. 5,882,385 or by a membrane on which metal or ceramic beads rest, which is the system currently used in O2 VSA. The major disadvantages with this radial technology are an increase in dead volumes and a high cost of manufacture.

SUMMARY

It is an object of the present invention to propose an improved fluid treatment installation in which zones or poor distribution and dead volumes are reduced.

One solution of the present invention is an installation for treating at least one fluid, comprising at least, in a section of a horizontal shell ring 1:
- at least one first particulate material filling a volume V2 opening on each side of the section of the shell ring through which the fluid circulates in a horizontal direction, the first particulate material being held in the volume V2 by two perforated gratings positioned at the 2 ends of the section of the shell ring,
- at least one deflector comprising 2 volumes V3a and V3b having 4 lateral faces S3-c, S3-d, S3-e and S3-f backing up against the two said perforated gratings situated at the two ends of the section of the shell ring, and delimited by the internal shell of the shell ring and on the other hand by lower surfaces S3a and S3b making with the horizontal plane an angle ($\alpha$) greater than the angle of repose of the first particulate material
- at least one volume V4 formed:
    - of a membrane adjoined the two volumes V3a and V3b of the deflector over the entire length of the section of the shell ring, and
    - of a second particulate material of a density greater than the density of the first particulate material with which the volume V2 is filled;
the second particulate material being contained in the space formed by the membrane and the internal shell of the shell ring,
the volumes V3a, V3b and V4 being situated in the upper half of the cross section of the horizontal shell ring.

The "angle of repose of the particulate material" means the angle of repose of the particulate material tipped out under gravity onto a receiving support of which the angle of the surface measured with respect to the horizontal is between 0 and 90° and more conventionally between 15 and 35° for adsorbent materials of particle diameters of between 0.5 mm and 5 mm.

Let it be noted that:
- the membrane compensates for vertical compaction; and
- the deflector as defined in the solution of the invention makes it possible to avoid the formation of a cavity with a free mound in the particulate material under the said surface.

The deflector is preferably welded to the shell ring.

Depending on circumstances, the installation of the invention may have one or more of the following features:
- the two volumes V3a and V3b of the deflector have at their ends situated on the downstream side of the shell ring orifices such that the surfaces S3-e and S3-f situated at these ends have a level of perforation of between 5 and 80%, preferably between 5 and 50%; the orifices allow the volumes V3a and V3b to be at the same pressure as the volume V2, making it possible to avoid fatigue at the anchor points where V3a and V3b are anchored to the shell ring,
- the two volumes V3a and V3b contain a material having an accessible porosity of less than 10%;
- the material contained in the two volumes V3a and V3b is a foam that can expand in its polyurethane form;

the shell ring is cylindrical;

the said installation is an adsorption purification unit.

For preference, a metal mesh is pressed firmly against the perforated gratings and fixed to the latter by suitable systems (stakes, washers, nuts, staples, etc.).

BRIEF DESCRIPTION OF THE DRAWINGS

For a further understanding of the nature and objects for the present invention, reference should be made to the following detailed description, taken in conjunction with the accompanying drawings, in which like elements are given the same or analogous reference numbers and wherein.

The invention will now be described in greater detail with the aid of FIGS. 1 to 3.

the two lateral surfaces S3-c and S3-d of the deflector. These are surfaces situated at the upstream end of the shell ring, the cross sections of the lower surfaces S3a and S3b of the deflector, which have a substantially V-shaped cross section, and the material contained in the two volumes V3a and V3b indicated by the hatched zones.

Let it be noted that this material prevents the volumes 3a and 3b from acting as dead volumes.

Figure 1:
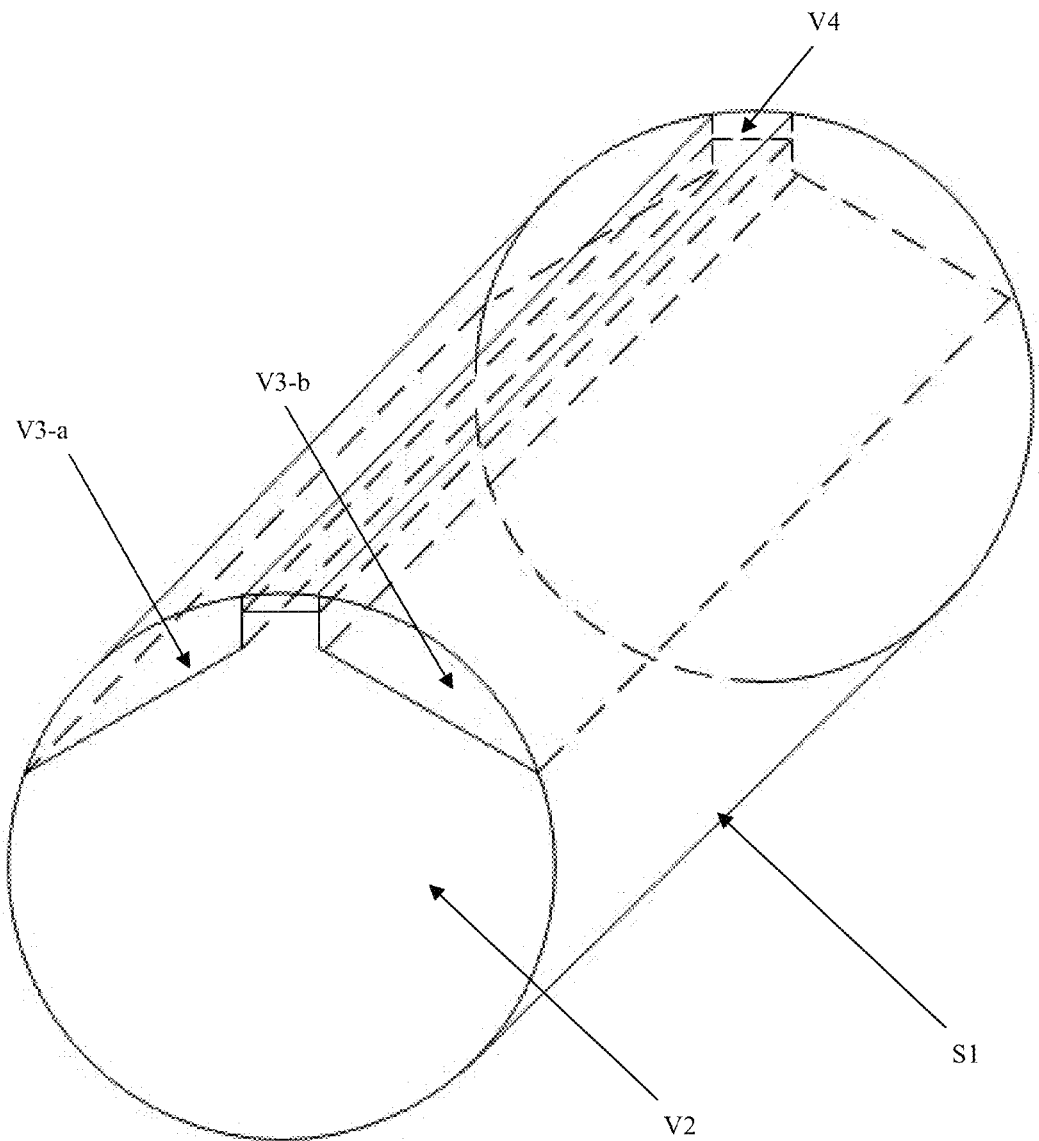
FIG. 1 depicts a general assembly of the installation according to the invention in the zone of the shell ring containing the adsorbent. It is possible to make out the contour of the horizontal shell ring 1 containing at least one first particulate material (volume V2), for example an adsorbent, for purifying or separating a gaseous mixture. In order to hold the particulate material and get around the problem of attrition and pressure drops a deflector situated in the upper part of the shell ring, the said deflector comprising 2 volumes V3a and V3b opening on each side of the shell ring and delimited on the one hand by the internal shell of the shell ring and on the other hand by lower surfaces S3a and S3b making with a horizontal plane an angle (α) greater than the angle of repose of the particulate material, is combined with a membrane formed of a strip V4 connecting the two volumes of the distributor and containing a material of a density greater than the density of the particulate mass.
Figure 2:
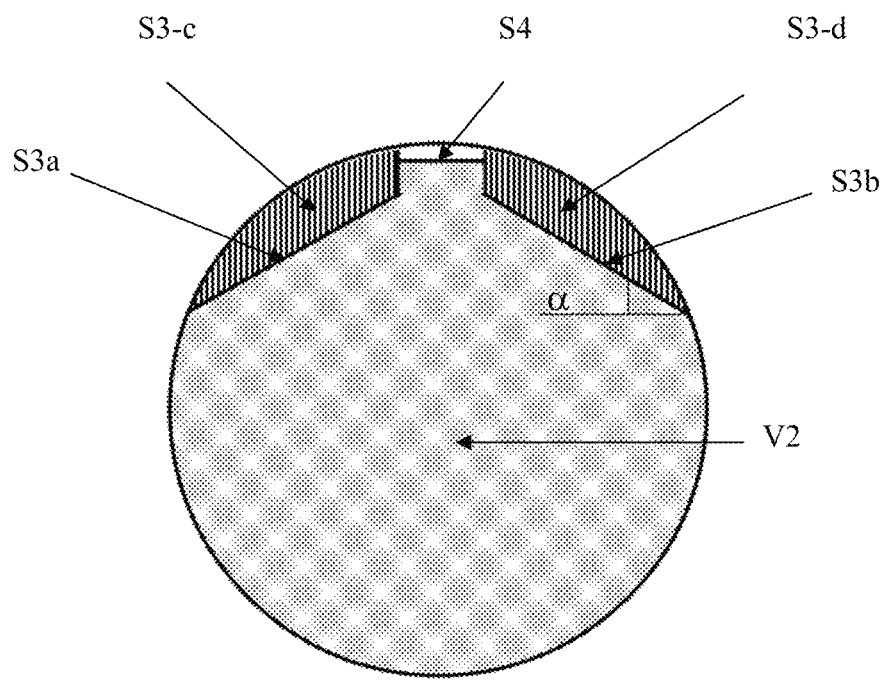
FIG. 2 depicts a view in cross section of the upstream side of the shell ring. It shows.
Figure 3:
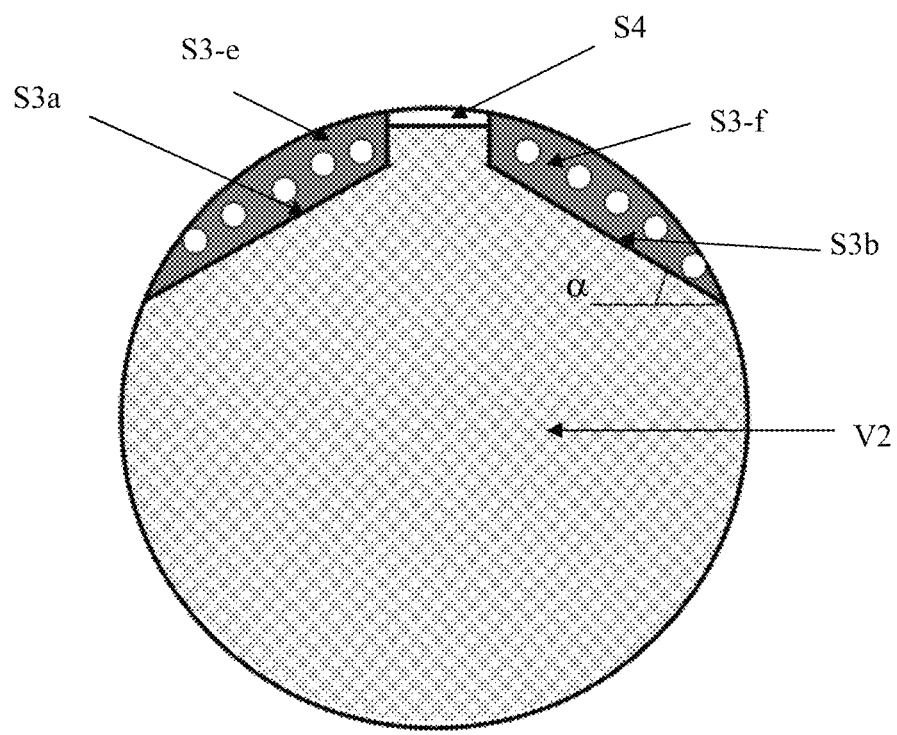

FIG. 3 depicts a view in cross section of the downstream side of the shell ring. It shows the orifices situated at the "downstream" end of the volumes 3a and 3b, on the surfaces S3-e and S3-f. These orifices prevent any back pressures as the fluid circulates.

DESCRIPTION OF PREFERRED EMBODIMENTS

In order to use the installation according to the invention the first particulate material will be introduced via one or more charging orifices situated on the upper part of the shell ring and providing access to the volume V2.

The volume V2 is filled until the first adsorbent particulate material occupies a significant proportion of the volume V2 delimited by the volumes V3-a, V3-b and the top part of the shell ring. The volume of first particulate material occupying this volume V2 needs to be such that it is able to compensate for the loss of volume of the first particulate material of the volume V2 that is carried away by the compaction of the particulate material that occurs when the purification or separation method is in operation. A flexible and fluid tight membrane, for example made of elastomeric material, S4 is then fitted, bonded laterally to the vertical walls of the volumes 3-a and 3-b and resting against the particulate material. Next, a second particulate material of greater density than the first particulate material is tipped out onto the dividing wall via the charging orifices used previously to introduce the particulate adsorbent. As the first particulate material compacts, the flexible and fluid-tight wall will thus deform and provide sealing under the pressure of the denser material.

Another subject of the present invention is the use of an installation according to the invention for separating at least one constituent of a gaseous mixture, for example for drying or purifying a gas and/or for separating at least one constituent from a gaseous mixture, for example purifying a stream of air that is to be distilled or producing oxygen and/or nitrogen from a stream of air.

The installation according to the invention is preferably a PSA installation.

The solution proposed by the present invention is not intended to avoid the pressure drop but does make it possible not to fluidize the bed because there is no longer any theoretical limit of attrition. What is meant by attrition is the phenomenon whereby the particles wear away by rubbing or knocking together. In particulate beds used in the conventional way in pressure swing or temperature swing adsorption methods, this wear occurs chiefly when the particles begin to move under the effect of a fluid, and this then generates "fines" which accentuate the phenomenon because the particles become increasingly small and this may cause the method to shut down completely. In the context of the invention, if a flow rate is treated beyond the limit of attrition the pressure drops will of necessity have to be greater than with an axial adsorber which will itself have been dimensioned not to exceed this limit and will have a larger diameter . . . therefore for methods in which the pressure drop is not key, the proposed solution offers the following advantage: greater compactness than a vertical axial bottle, and lower investment than a radial bed.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

The invention claimed is:

1. An installation for treating at least one fluid, comprising at least, in a section of a horizontal shell ring (1):

at least one first particulate material filling a volume (V2) opening on each side of the section of the shell ring through which the fluid circulates in a horizontal direction, the first particulate material being held in the volume (V2) by two perforated gratings positioned at the 2 ends of the section of the shell ring, at least one deflector comprising 2 volumes (V3a) and (V3b) having 4 lateral faces (S3-c), (S3-d), (S3-e) and (S3-f) backing up against the two said perforated gratings situated at the two ends of the section of the shell ring, and delimited by the internal shell of the shell ring and on the other hand by lower surfaces (S3a) and (S3b) making with a horizontal plane an angle (α) greater than the angle of repose of the first particulate material at least one volume (V4) formed:

of a membrane adjoined the two volumes (V3a) and (V3b) of the deflector over the entire length of the section of the shell ring, and of a second particulate material of a density greater than the density of the first particulate material with which the volume (V2) is filled;

the second particulate material being contained in the space formed by the membrane and the internal shell of the shell ring, the volumes (V3a), (V3b) and (V4) being situated in the upper half of the cross section of the horizontal shell ring.

2. The installation of claim 1, wherein the two volumes (V3a) and (V3b) of the deflector have at their ends situated on the downstream side of the shell ring orifices such that the surfaces (S3-e) and (S3-f) situated at these ends have a level of perforation of between 5 and 80%.

3. The installation of claim 1, wherein the two volumes (V3a) and (V3b) contain a material having an accessible porosity of less than 10%.

4. The installation of claim 3, wherein the material contained in the two volumes (V3a) and (V3b) is a polyurethane foam that can expand.

5. The installation of claim 1, wherein the shell ring is cylindrical.

6. The installation of claim 1, wherein the installation is an adsorption purification unit.

* * * * *